United States Patent [19]

Moller

[11] Patent Number: 4,795,111

[45] Date of Patent: Jan. 3, 1989

[54] ROBOTIC OR REMOTELY CONTROLLED FLYING PLATFORM

[75] Inventor: Paul S. Moller, Dixon, Calif.

[73] Assignee: Moller International, Inc., Davis, Calif.

[21] Appl. No.: 15,100

[22] Filed: Feb. 17, 1987

[51] Int. Cl.$^4$ ............................................. B64C 29/02
[52] U.S. Cl. ............................... 244/23 C; 244/12.2; 244/12.5; 244/100 R; 244/23 D; 244/17.19
[58] Field of Search ............... 244/17.11, 17.19, 17.21, 244/23 C, 12.2, 23 A, 12.3, 17.17, 23 D, 219, 34 A, 100 R, 73, 12.5, 26

[56] References Cited

U.S. PATENT DOCUMENTS

| | | | |
|---|---|---|---|
| 1,775,783 | 9/1930 | Perrin | 244/17.19 |
| 2,371,687 | 3/1945 | Gerhardt | 244/17.17 |
| 2,730,311 | 1/1956 | Doak | 244/12.2 |
| 2,952,422 | 9/1960 | Fletcher et al. | 244/12.2 |
| 2,968,453 | 1/1961 | Bright | 244/12.5 |
| 3,128,062 | 4/1964 | Brocard | 244/23 C |
| 3,223,359 | 12/1965 | Quick et al. | 244/17.17 |
| 3,640,485 | 2/1972 | Mutrux | 244/12.2 |
| 4,196,877 | 4/1980 | Mutrux | 244/17.19 |
| 4,235,397 | 11/1980 | Compton | 244/23 D |
| 4,247,066 | 1/1981 | Frost et al. | 244/219 |

Primary Examiner—Galen Barefoot

Attorney, Agent, or Firm—Rosenblum, Parish & Bacigalupi

[57] ABSTRACT

A flying platform, propelled by at least one ducted fan causing a vertically downwardly directed airstream in and through a cylindrical duct. A vane system in the duct has two mutually perpendicular pairs of diametrically opposite first vanes, each extending in from the duct rim toward the center of the duct. Each pair of first vanes provides a pair of generally vertical walls parallel to a diametral line across the duct, and they define duct passages between the pairs of vanes and define quadrants between adjacent pairs. Each first vane has an upper, fixed, rigid portion and a variable camber flap depending therefrom. A first servomotor with linkages vary the camber of each pair of flaps, so that the camber of the flaps of each pair is at all times the same amount but in opposite directions. Preferably, there are also four second vanes, one bisecting each quadrant, and a symmetric pair of spoilers is mounted on each second vane. Each pair of spoilers is independently movable, as a pair continuously between a position substantially blocking airflow through the outer portion of said quadrant and a position permitting substantially full airflow therethrough. A second servomotor with linkages symmetrically varies the position of its spoilers. There may be a radio receiver responsive to remote control signals for actuating each servomotor and its linkages.

19 Claims, 7 Drawing Sheets

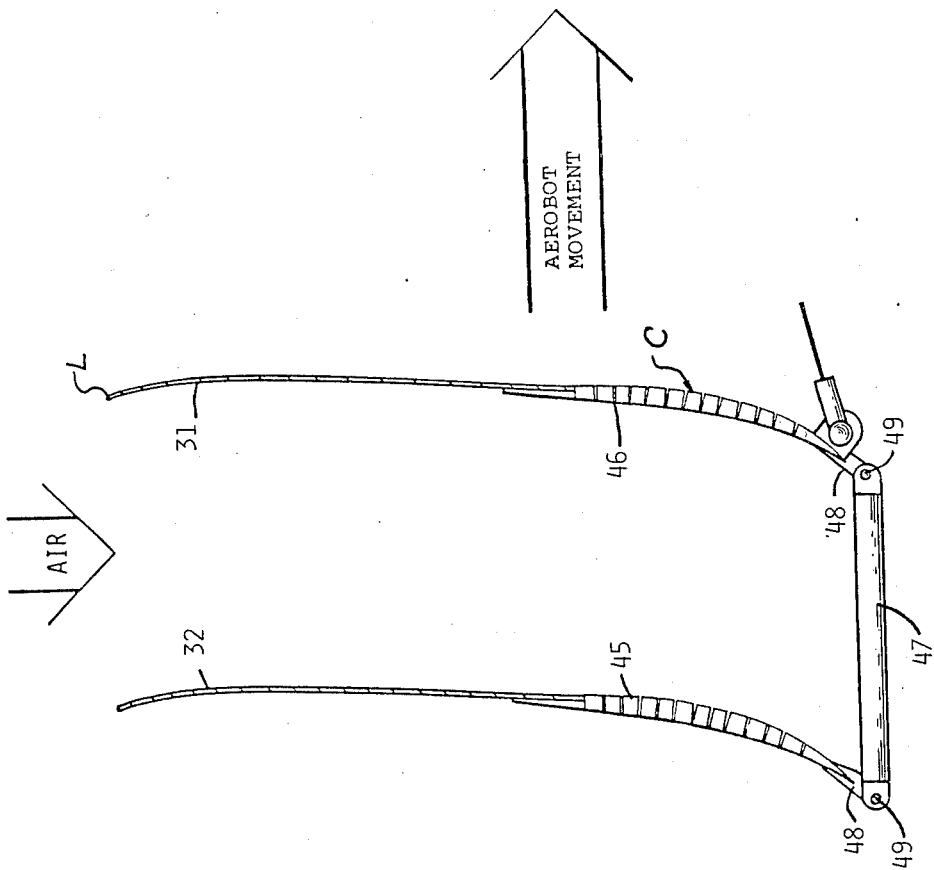
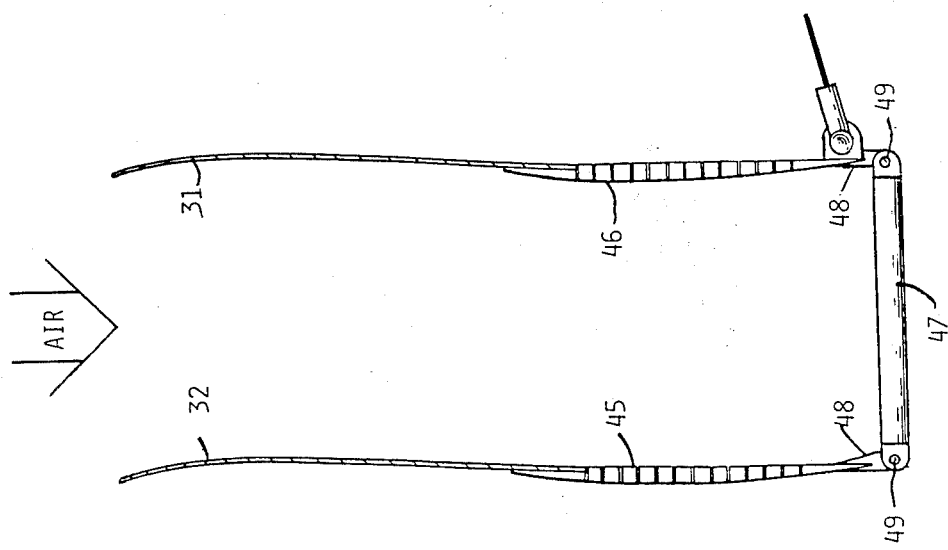

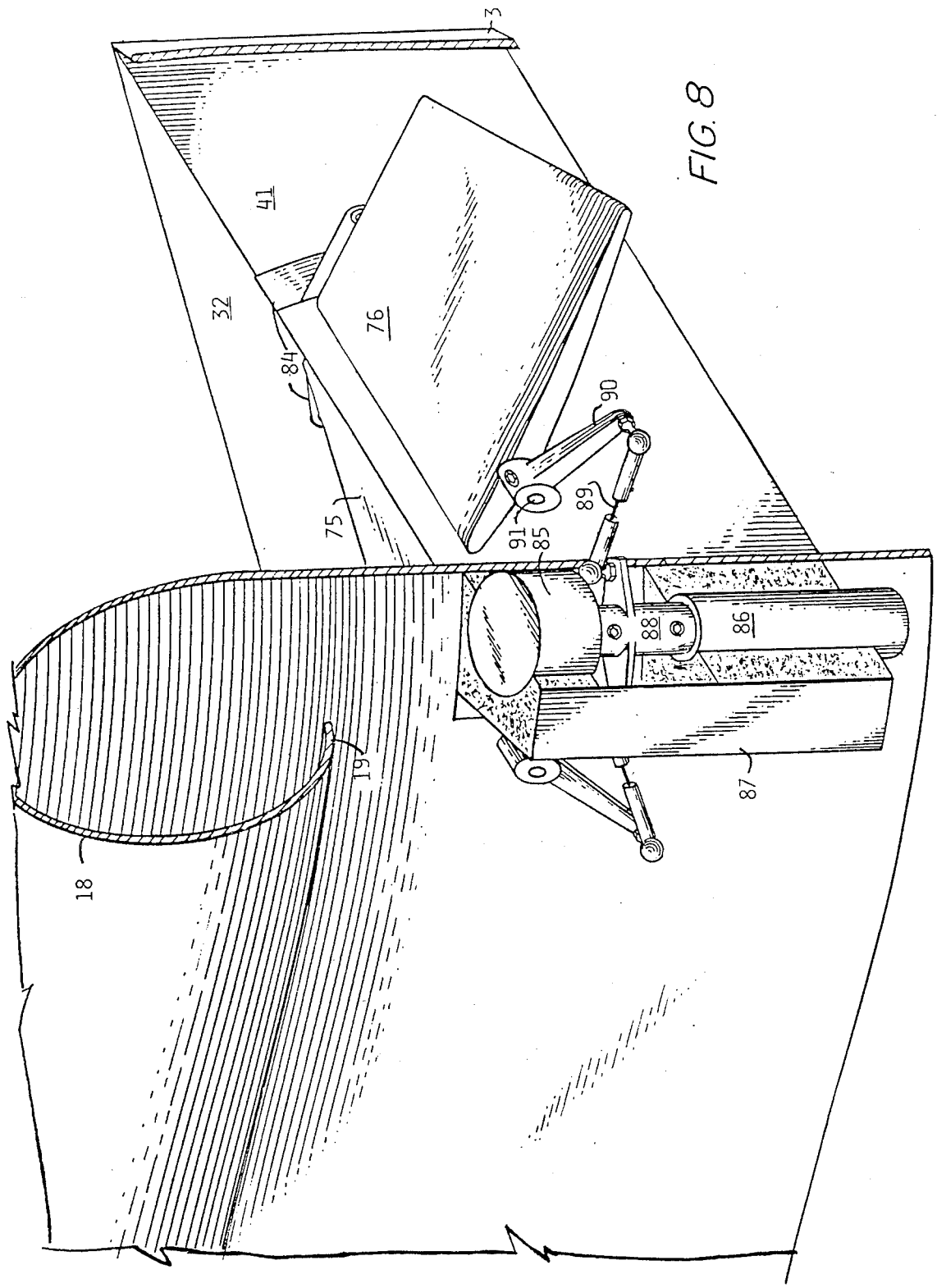

ROBOTIC OR REMOTELY CONTROLLED FLYING PLATFORM

This invention relates to a flying platform which may be robotic or remotely controlled. The invention pertains more particularly to VTOL aircraft of the type employing one or more ducted fans.

BACKGROUND OF THE INVENTION

Even a single-engine ducted-fan, VTOL aircraft can deliver modest payloads by air, remotely and inexpensively. For example, the payload may be a task-performing arm for cleaning high-voltage insulators that are located in positions high above ground level and are difficult to get at. The payload may be a data acquisition package for use in such environments as prisons or along a military front. For example, these ducted-fan VTOL aircraft may help guards in prison security situations, or may serve to seek out and even destroy military tanks, for tanks can be destroyed with very light munitions. Such VTOL devices may also be used to clean or inspect apparatus in high, remote, and/or dangerous areas, and for data acquisition, even in hostile environments. They may be used for remote painting or for traffic surveillance. They can perform such simple tasks as routine inspection and simple cleaning. They may be used in cattle range operations.

These, of course, are only examples of where such aircraft may be used. These aircraft need not carry a person, although, in large embodiments, that becomes possible. They may be controlled entirely robotically or by remote control via electrical cables or by radio.

The main difficulties with such apparatus heretofore have been to obtain precise control and to do so in a relatively inexpensive manner that is easy for an operator to employ.

Heretofore, most of the efforts to control such vehicles have relied on the tilting of vanes in the slip stream. Depending on their position or deflection, such vanes have been able to provide a moderate degree of control. For example, a vane well below the center of gravity tended to rotate the vehicle about its center of gravity, thereby shifting the vertical lift vector away from the gravitational direction and creating a lateral thrust component enabling movement of the vehicle in the direction of the tilt of the lifting vector. However, in this instance a secondary counteracting effect was also generated, because the vane forces were at right angles to the vane's chord and in the opposite direction from the desired direction of motion; as a result, this counteraction reduced the effectiveness of the principal action as a control means. When the vanes were mounted closer to the center of gravity, this counter force became even greater and tended to equal the force generated by the rotating lift vector, so that there was no control power whatever.

Because of this fact, such vanes have generally been mounted quite far behind the propeller or fan, thereby requiring a long duct or resulting in a system that had a reduced translational speed due to its increased drag. Experience has shown that such type of control was only marginally effective, except at low speeds and in calm conditions. In a crosswind, parasitic drag, due to the components below the center of gravity, tended to make the aircraft difficult to orient and to control.

An additional factor that hampered control of single engine ducted fan type of aircraft was that there were gyroscopic moments due to the rotating fan and to its engine components. If control was to be obtained by tilting the vehicle, then these gyroscopic forces tended to interfere with the vehicle's action. These gyroscopic forces were very time-dependent and prevented control of a tilting aircraft when the required rate of correction of the tilt was high, as, for example, in turbulent air. While counterrotating fans might have helped, these would have been expensive, heavy, and inefficient.

An alternative control means used spoilers in the airstream. For example, if one desired to move the VTOL aircraft to the left, spoilers on the left side of the duct would be employed in the airstream and would reduce the thrust on that side. The left side would then drop, so that the vehicle would tilt and would then translate to the left. While this was a more positive type of control, it had two serious negative effects:

(1) it tended to reduce significantly the overall lift capability of the vehicle, especially if a modest to high translational speed was needed, or if station holding was required in even a modest crosswind;

(2) there was a sizable coupling between the pitch-and-roll axis and the vertical or heave direction. In other words, as the spoilers were engaged and disengaged, the vehicle fell and rose.

Also, in spoiler types of control, gyroscopic moments continued to present a problem.

Significant spoiling of the airflow also adversely affected the efficiency of the fan and increased the noise generated by the fan.

Other proposed control methods include differential control of the fan blade angles. While this might be effective and efficient, it would also be heavy, reducing the pay load, and very expensive. This technique is employed by helicopters, where it is appropriate. With small single-duct aircraft, the gyroscopic moments would increase with systems employing vane or spoiler controls, and, in fact, would become prohibitively heavy and expensive in connection with pitch control.

Extensive testing of both deflection-vane and spoiler systems and combinations of both, has resulted in the conclusion that single-engine designs requiring the vehicle to tilt, to generate control power, or to provide translation, were not practical except in ideal environments and at low translational speeds.

SUMMARY OF THE INVENTION

The present invention, whether utilizing a single-engine ducted fan or utilizing a plurality of such ducted fans, provides pitch-and-roll control seperate from translational control. The invention employs vanes and spoilers, but in a different way. The spoiler system is automatically driven by an on-board inertial reference system, and the spoilers are deployed only for the purpose of keeping the vehicle lift axis parallel to or coincident with the gravitational axis. The moment of inertia about the pitch-and-roll axis and the response time of the spoilers are both minimized, so that only very low forces are required from the spoilers. The result is that there is little loss of lift; hence, there is little coupling between the pitch-and-roll control and the heave or vertical movement. The remote pilot can trim to level the vehicle, but trimming is not used for controlling maneuvers about the pitch-and-roll axis.

All of the spoilers in this invention are paired in each quadrant. This insures that no torque or force is generated which might rotate the vehicle about the vertical or yaw axis when the spoilers are employed. The pivot axis of each spoiler vane is chosen to coincide with the position where the torque on the spoiler is minimized as a function of its angular position. This positioning reduces the amount of torque required to deploy the pair of spoilers and hence reduces the size of the servomotors required.

Most of the spoiler surface is concentrated near the maximum duct diameter, in order to maximize the resulting control moment. Preferably, the spoilers are made of extremely light material in order to minimize their inertia and to obtain rapid spoiler response with minimum servo-motor power.

Translational control is obtained by use of a different type of vane, a flexible vane instead of a pivoted rigid vane. In a deflection vane system, it is important to recognize that a rigid vane generates two major problems when used to deflect a slip stream:

(1) The forces generated by swinging a rigid vane are highly nonlinear relative to the changing angle of the vane, and particularly when the aircraft is near the stall condition.

(2) The stall condition is reached by rigid vanes at fairly low angles of vane deflection, generally less than 15°. However, for significant translational forces, such as those which are required to move a vehicle of this type at a velocity greater than one-third of the slip stream velocity, the slip stream deflection required becomes significant and is greater than 15°. It is very difficult, if not impossible, to achieve such deflection with a rotating rigid vane without stalling the vane.

Therefore, the present invention employs a variable-camber vane or flap, which is attached to the trailing edge of fixed anti-torque vanes that serve to remove the swirl introduced by the fan.

The invention thus obtains translational control by redirecting the slip stream with vanes that are provided with flexible camber portions or flaps extending downwardly from an upper fixed rigid portion, and the vanes are mounted so that the center of lift or force providing the transverse force is at or as close as possible to the center of gravity of the vehicle. This mounting ensures that deflection of the variable-camber vane or flap does not generate significant moments about the center of gravity; such moments, if generated, would have to be overcome by the spoiler system. Small coupling moments are automatically dealt with by the spoiler system and result only from forces produced about the pitch-and-roll axis, due to translational control.

This vane system is one of the most important elements of the success of this design. If the flexible portion of the vane is equal in size to the rigid upstream portion, then the transverse force (or center of pressure) of the rigid-flexible deflector vane occurs at approximately the three-quarter chord position back from the leading edge. Put another way, the center of pressure or lift appears to occur near the center of the flexible portion of the vane. In fact, this position is a function of the amount of vane deflection. For greater deflections this position is probably correct. For small deflections this center of pressure will be farther forward. Ideally, the center of left on the vane is at the center of gravity of the vehicle, on the vertical axis.

The variable-camber vanes of this invention act like a flap (or aileron) on a wing. Such a flap may involve comparatively small forces and be small in size relative to the forces it can generate. Thus, when a variable-camber vane system employs two or more vanes in parallel, a cascade vane effect is created. This cascade effect continues to deflect the slip stream up to 90°, if that should be necessary. However, it is unlikely that deflection greater than 30° will ever be required.

More succinctly summarized, the invention comprises a robotic or remotely controlled flying platform. There is least one ducted fan, comprising power means, a horizontally mounted fan connected to and driven by the power means for causing a vertically and downwardly directed airstream, and a cylindrical duct that extends around and beneath the fan, for confining the airstream. In the duct is a vane system comprising two mutually perpendicular pairs of diametrically opposite generally rectangularly shaped duct segments, each defined and bounded by a pair of generally vertical stationary walls extending across the duct parallel to a diametral line thereacross. Each pair of these walls also defines one boundary of a quadrant shaped duct segment located between adjacent wall pairs. Each duct segment forming a wall includes an upper, rigid portion having a variable-camber flap portion affixed to its lower extremity. A first set of remotely controlled servo motors is employed for varying the camber of each of the flaps. In each pair of variable vanes, the flap camber is at all times the same in amount and direction for both flaps.

There are also additional rigid vanes bisecting the quadrants. Each such additional vane has mounted thereon a symmetric pair of spoilers, so that there is one spoiler in each half-quadrant. Each pair of spoilers is independently movable (as a pair) continuously between a position substantially blocking airflow through its quadrant and a position enabling substantially full airflow therethrough. A second set of remotely controlled servomotors is used to control the positioning of the respective pairs of spoilers.

BRIEF DESCRIPTION OF THE DRAWINGS

FIG. 6 is a simplified fragmentary view in elevation of one duct portion, showing two non-activated camber vanes.

FIG. 7 is a view similar to FIG. 6 with the camber vanes actuated.

FIG. 8 is an enlarged fragmentary view in perspective of a portion of the aircraft of FIG. 1, showing a pair of spoilers and their control linkages.

DESCRIPTION OF PREFERRED EMBODIMENTS

Figure 1:
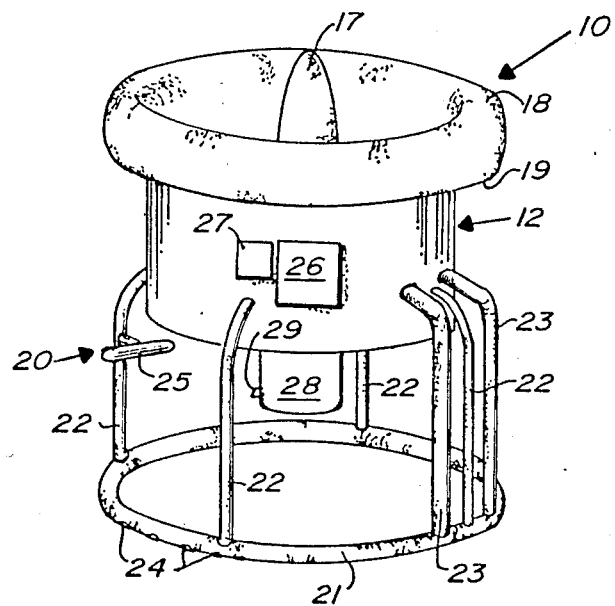
FIG. 1 is a view in perspective of an aerobotic single-engine ducted VTOL aircraft embodying the principles of the invention, looking slightly from above.

FIGS. 1 through 8 show a single-engine ducted-fan VTOL aircraft 10 with a propeller 11 and a duct 12. The fan or propeller 11 is mounted horizontally on a shaft 13 and is powered by a single engine 14 below it. The illustrated propeller 11 has two blades 15 and 16 and a nose 17.

Figure 2:
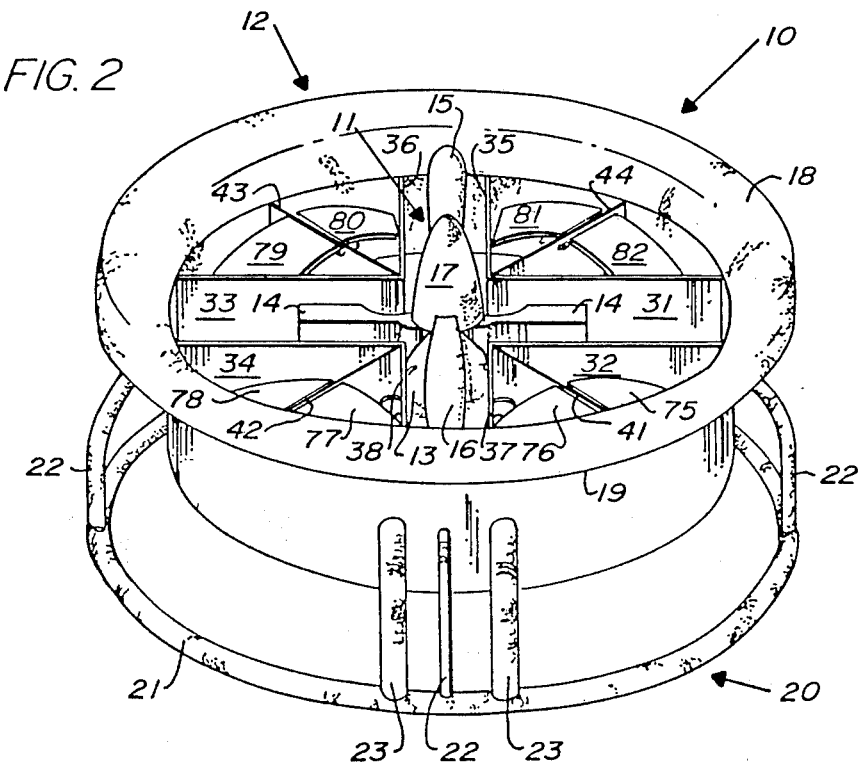
FIG. 2 is another view in perspective, looking from a higher viewpoint, of the aircraft of FIG. 1.

The circular duct 12 has a curved flange 18 at its upper end and has a planar lower edge 19. As shown in FIGS. 1 and 2 the duct 12 may have a support member 20 with a hollow bottom or base ring 21 and four support columns 22. The ring 21 also serves as a muffler and is connected by a pair of vertical exhaust tubes 23 to the exhausts from the engine 14, there being two such exhaust tubes for a two-cylinder engine 14. The exhaust gas goes down the tubes 23 into the ring 21 and passes out from the ring 21 at exhaust openings 24, spaced around the ring 21 at distances beginning about 90° away from the tubes 23 and extending downwardly at about 45°.

An antenna 25 may be mounted on one support column 22 to pick up control signals sent by a remote-control transmitter, not shown. Mounted on the exterior face of the duct 12 is a series of control devices, each a standard type of electronic device, including a detector and receiver 26, and various programmed control initiators 27, which control the engine 14 and the various lever systems described below. The engine 14 itself may be a gasoline engine, and may have a fuel tank 28 below it; to one side lies an air inlet 29. For small aircraft 10, a two-cylinder engine 14 may be used; for larger aircraft a radial engine may be used.

In the duct 12 are twelve fixed vanes 31, 32, 33, 34, 35, 36, 37, 38, 41, 42, 43, and 44.

The eight identical vanes 31, 32, 33, 34, 35, 36, 37, and 38 are disposed along two mutually perpendicular axes; that is, there are four vanes 31, 32, 33, 34 arranged as two diametrically opposite pairs 31, 32 and 33, 34 parallel to one diametral line 39 (FIG. 3), and there are two other diametrically opposite pairs of vanes 35, 36 and 37, 38 parallel to a diametral line 41 perpendicular to the line 39. Each pair of vanes forms a generally rectangularly shaped duct segment and adjacent pairs form generally quadrant shaped duct segments. These eight vanes 31–38 are preferably not simply vertical planes but are preferably shaped as shown in FIGS. 6 and 7, and they each have a variable-camber flap 45 or 46 attached to their lower or trailing edge.

For yaw control, or control about the vertical axis, the flaps 45 and 46 of all eight of these vanes 31 through 38 move together in the same rotational direction, resulting in torque about the vertical axis. For translational control, the flaps 45 and 46 of two diametral pairs move together (See FIG. 7), while the flaps 45 and 46 of the other diametral pairs either do not move or move in a direction or directions. As a result, a force is generated for accelerating the vehicle 10 horizontally at a speed up to a point where its aerodynamic drag equals its ventable translational force.

Preferably, each camber flap 45-46 is equal in area to its respective vane 31–38. As a result the center of pressure of the vane-flap combination occurs at the three-quarter chord position C back from the leading edge L, i.e., near the center of the camber flap 45 or 46, and this is where the center of pressure of the vanes occurs. This center of pressure is kept as close as possible to the position along the vertical-axis occupied by the center of gravity of the aircraft 10 and is preferably within the limits of the vertical extremities of the flaps 45–46.

Figure 5:
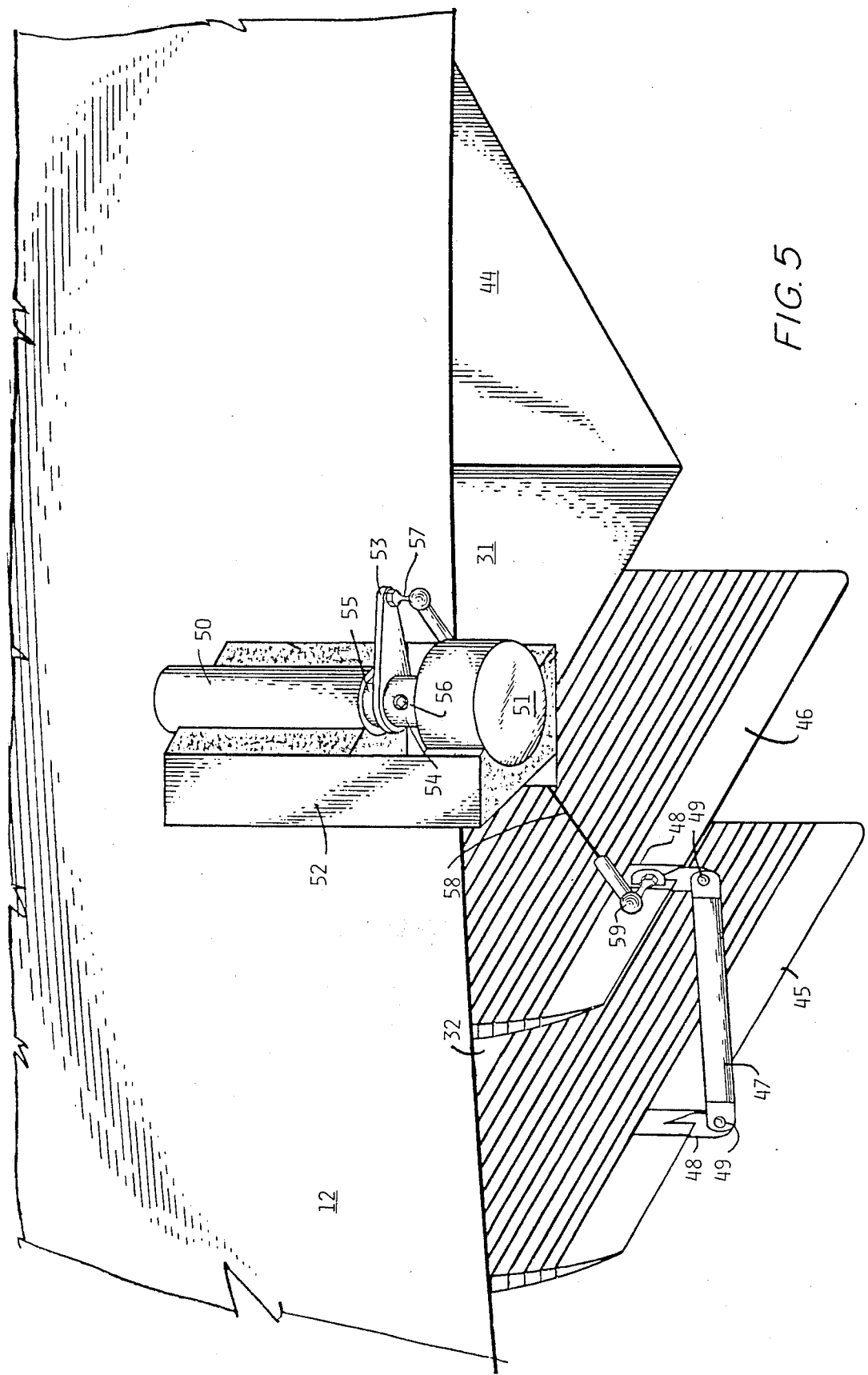
FIG. 5 is an enlarged fragmentary view in perspective of a portion of the aircraft of FIG. 1, looking from below, showing a portion of the camber vane control.

Each pair of flaps 45 and 46 is joined together by a tie rod 47 having a clevis clip 48 at each end pivoted to it by a pin 49, controlled, as shown in FIG. 5, by a servomotor 50. The servomotor 50 is actuated by a remotely controlled potentiometer 51, and both are in a foam-rubber fitted housing 52. The servomotor 50 acts on the tie rod 47 through the vane control arm 53, having a sleeve 54 held on a servomotor shaft 55 by a recessed Allen-head screw 56. The arm 53 may act through a ball-and-socket joint 57 on a drag linkage 58, which operates on the tie rod 47 through another ball-and-socket joint 59.

Figure 3:
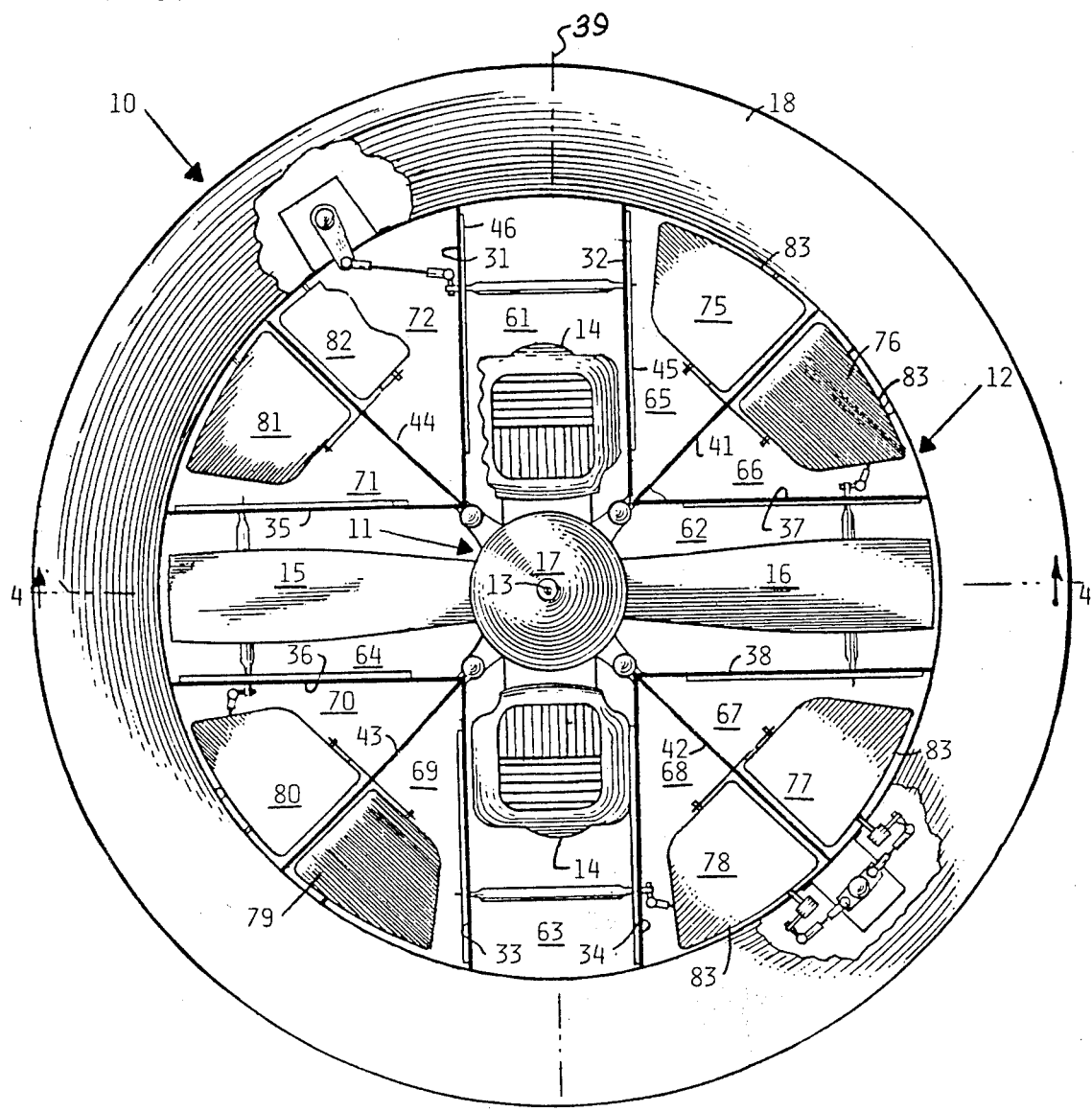
FIG. 3 is a top plan view thereof.
Figure 4:
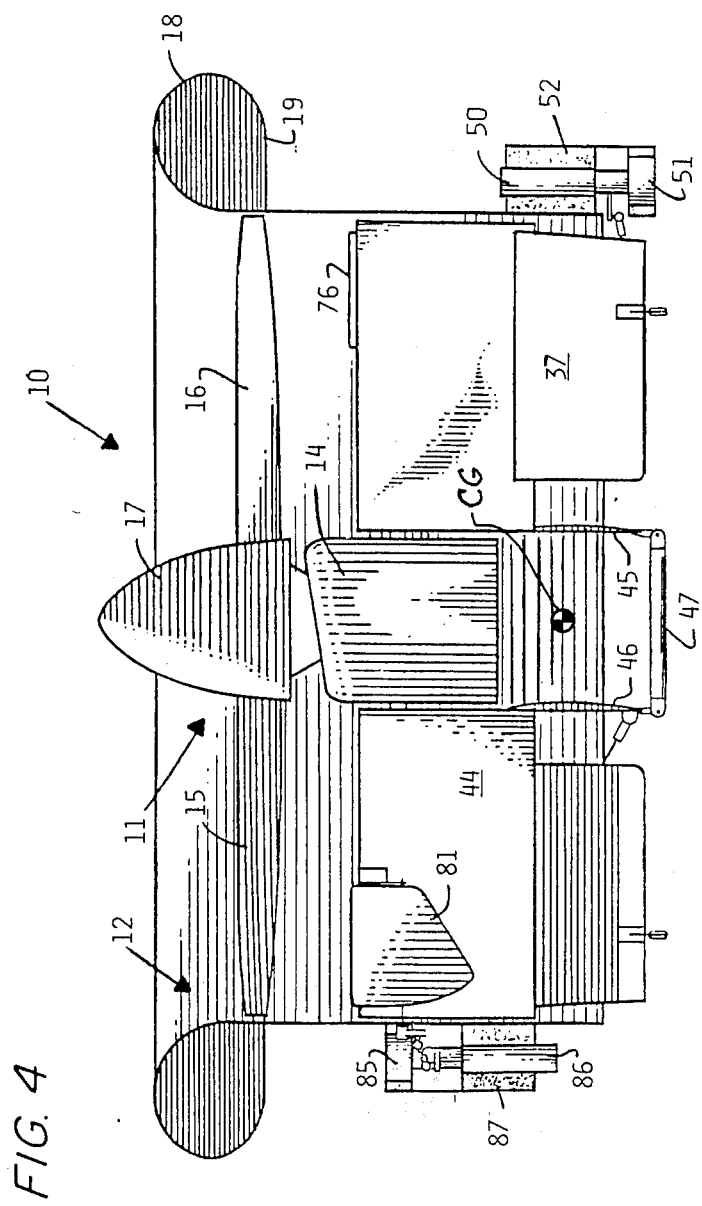
FIG. 4 is a view in section taken along the line 4—4 in FIG. 3, with one spoiler shown vertical and one horizontal. (This is for illustrative purposes only; the pair of spoilers always act together.)

The other four vanes 41, 42, 43, and 44 (FIG. 2) are rigid and extend in from the wall of the duct 12 to bisect the right angles made by the mutually perpendicular vanes 32, 37 and 38, 34 and 33, 36 and 37, 31 (FIG. 3). In other words the vanes 41, 42, 43, and 44 lie at an angle of 45° to the eight diametral vanes 32, 37 and 38, 34 and 33, 36 and 35, 31. Preferably, these four vanes 41, 42, 43, and 44 are not simply vertical planes but are shaped like the rigid upper portions of the vanes shown in FIGS. 6 and 7 (but without the attachment of variable-camber vanes).

Between the vanes 31 and 32 is a generally rectangular duct segment or passage 61; between the vanes 33 and 34 is a diametrically opposite rectangular passage 63. At right angles to these openings are a rectangular passage 64 between the vanes 35 and 36 and a rectangular passage 62 between the vanes 37 and 38. Thus, between the vanes 32 and 37 is a quadrant divided into two equal passages 65 and 66 by the vane 41; between the vanes 38 and 34 is a quadrant shaped duct segment divided into two equal passages 67 and 68 by the vane 42; between the vanes 33 and 36 is a quadrant shaped segment bisected into two passages 69 and 70 by the vane 43; and between the vanes 35 and 31 is a quadrant shaped segment bisected into two passages 71 and 72 by the vane 44.

Each vane 41, 42, 43, and 44 preferably supports a pair of spoilers 75, 76 or 77, 78 or 79, 80 or 81, 82, one for each passage 65, 66, 67, 68, 69, 70, 71 and 72. The spoilers 75–82 each have a circular-arc outer rim 83 concentric with the duct 12 and are otherwise generally trapezoidal in shape to fill most of the outer portion of their respective passages 65–72 when in the fully closed or horizontal position, as depicted in FIGS. 2 and 3. When rotated down to their fully open or vertical position, they lie generally parallel to their respective vanes 41–44, as shown at 81 in FIG. 4, and take up very little room in the passages 65–72.

The spoilers 75–82 are each supported by their associated vanes 41–44 through a tension bracket 84 and are operated, as shown in FIG. 8, via a remotely activated system embodying a potentiometer 85 supported with a servomotor 86 inside a housing 87. The servomotor 86 operates, like the servomotor 50, through a linkage arm 88 and a drag linkage 89 having a ball-and-socket joint at each end, and a lever arm 90 that rotates on shaft 91.

In each quadrant, a single servomotor 86 operates the pair of spoilers 75, 76 etc.; so that in each quadrant the spoilers are paired. Moreover, the pivot axis of each spoiler lies along and coincides with the position where the torque on its spoilers is minimized as a function of its angular position; thereby the torque required to deploy that pair of spoilers is reduced, and the size of the servomotors 86 is kept small. Since each spoiler 75–82 has its surface concentrated near the duct wall, the resulting control moment is maximized. Each spoiler may be made from lightweight wood, to minimize its inertia and provide rapid response to its servomotor 86.

The functional mixing of yaw and translation forces is preferably done electronically by the control circuits 27, with the vehicle 10 employing eight separate servomotors 50 and 86 for control. Thus, there are four servomotors 50 for yaw or translational controls and four servomotors 86 for pitch-and-roll controls. One servomotor controls one parallel set of yaw vanes or one pair of spoilers.

This system for controlling the flight of the vehicle 10 has the additional capability of being able to trim the vehicle 10 into a nonvertical position and holding that position through the use of translational control power. This may be a very important advantage when a rigidly attached TV camera is used and is directed in the plane of vision by gimballing the vehicle rather than gimballing the camera. The importance of this can be seen from the fact that the gimbal used in the Aquila RPV military surveillance drone costs more than the aircraft and the other electronics on it, all taken together.

The means of control through separation of pitch-and-roll control from translational control is also appropriate to manned aircraft as well as unmanned aircraft.

Figure 9:
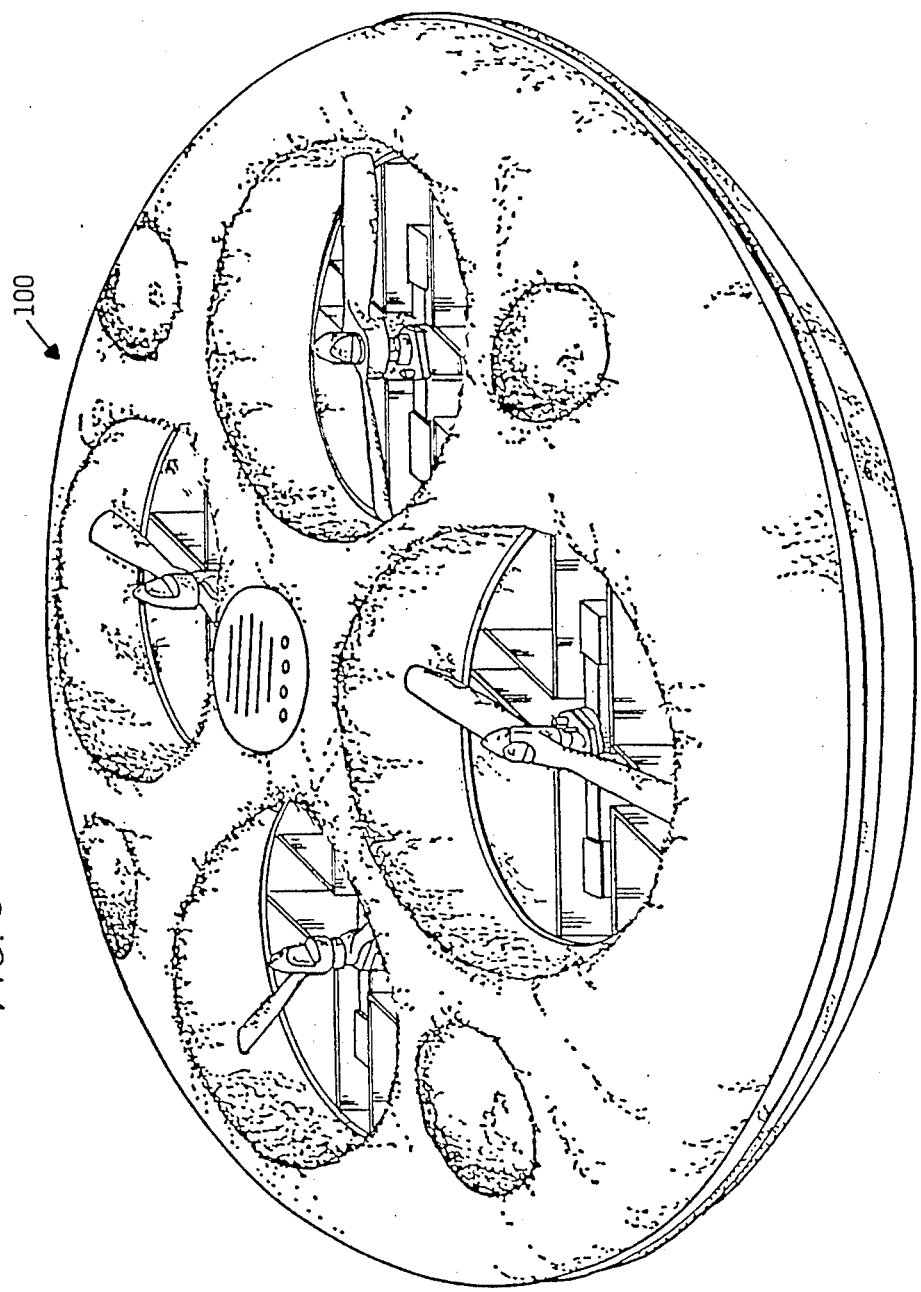
FIG. 9 is a view in perspective of a modified form of aircraft embodying the invention, having four propellers and four ducts and no spoilers.

If the aircraft employs a plurality of ducts, as in the case of the aircraft 100 shown in FIG. 9, then the spoiler approach can be augmented or even replaced by a system that alters the thrust in the individual ducts, either by individual fan pitch control or individual throttle engine control.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A flying platform, including in combination:
   at least one ducted fan comprising power means, a horizontally mounted propeller having blades and connected to and driven by said power means for causing a vertically downwardly directed airstream, and a cylindrical duct having an outer rim extending around and beneath said propeller for confining said airstream, and
   a vane system in said duct comprising four pairs of first vanes, the vanes of each pair being parallel to each other and to a diametral line across the duct end extending in from said rim toward the center of the duct, each said pair of first vanes providing a pair of generally vertical walls defining generally rectangularly shaped duct passages and the walls of adjacent pairs defining quadrant shaped duct passages, each said first vane having an upper, fixed, rigid portion and a variable camber flap depending therefrom, and first servomotor and linkage means for varying the camber of each of said flaps, so that the camber of the flaps associated with a particular pair of said first vanes is at all times the same amount said flaps being positioned along the vertical axis of said duct so that the center of gravity of said platform lies within the limits of the upper and lower extremities of said flaps whereby said flaps may be used to provide yaw and translational forces to said platform without imparting significant pitch and roll moments about said center of gravity.

2. The flying platform of claim 1 including, four second vanes, one bisecting each said quadrant shaped passage,
   symmetric pairs of spoiler means disposed in each said quadrant shaped passage and mounted on one of said second vanes, each said pair of spoiler means being independently movable between a position substantially blocking airflow through the outer portion of said quadrant shaped passage and a position permitting substantially full airflow therethrough, and
   second servomotor and linkage means for selectively and symmetrically varying the position of the flaps of each said pair of spoiler means.

3. The platform of claim 2 having receiving means responsive to remote control signals for actuating each said servomotor and linkage means.

4. The platform of claim 1 wherein the area of each said first vane and the area of each said camber flap are substantially equal.

5. The platform of claim 1 wherein the vertical height of each said flap is approximately equal to the vertical height of its associated said rigid portion.

6. The platform of claim 1 having a ground support assembly which also serves as an exhaust and muffler system for said power means, said power means being a combustion engine having exhaust ports, said support assembly comprising:
   a base hollow ring lying in a plane parallel to the upper and lower ends of said duct,
   support columns connecting said ring to said duct, and
   exhaust tubes connecting the interior of said ring to said exhaust ports;
   said ring having exhaust ports therefrom at least 90° around said ring from the nearest exhaust tube, said ring exhaust ports being directed downwardly at about 45° from the plane of said ring.

7. The flying platform of claim 1 having a plurality of said ducted fans, each with a said vane system.

8. A robotic or remotely controlled flying platform, including in combination:
   at least one ducted fan comprising power means, a horizontally mounted propeller having blades and connected to and driven by said power means for causing a vertically downwardly directed airstream, and a cylindrical duct having an outer rim extending around and beneath said propeller for confining said airstream,
   a vane system in said duct comprising two mutually perpendicular pairs of diametrically opposite first vanes, each extending in from said rim toward the center of the duct, each said pair of first vanes providing a pair of generally vertical walls parallel to a diametral line across said duct, said walls defining duct passages between the pairs of said first vanes and defining quadrants between adjacent pairs, each said first vane having an upper, fixed rigid portion and a variable camber flap depending therefrom, and first servomotor and linkage means for varying the camber of each pair of said flaps, so that the camber of the flaps of each pair of first vanes is at all times the same amount,
   four second vanes, one bisecting each said quadrant,
   a symmetric pair of spoiler means in each said quadrant mounted on one said second vane, each pair being independently movable continuously between a position substantially blocking airflow through the outer portion of said quadrant and a position permitting substantially full airflow therethrough, second servomotor and linkage means for each said pair of spoiler means for symmetrically varying the position of its said spoiler means, and receiving means responsive to remote control signals for actuating each said first and second servomotor and linkage means.

9. The platform of claim 8 wherein the area of each said first vane and the area of each said camber flap are equal.

10. The platform of claim 9 wherein the vertical height of each said flap is approximately equal to the vertical height of its associated said rigid portion.

11. The platform of claim 8 having a ground support assembly which also serves as an exhaust and muffler system for said power means, said power means being a combustion engine having exhaust ports, said support assembly comprising:

a base hollow ring lying in a plane parallel to the upper and lower ends of said duct, support columns connecting said ring to said duct, and exhaust tubes connecting the interior of said ring to said exhaust ports;

said ring having exhaust ports therefrom at least 90° around said ring from the nearest exhaust tube, said ring exhaust ports being directed downwardly at about 45° from the plane of said ring.

12. A flying platform, comprising in combination:

at least one ducted fan including power means, a horizontally mounted propeller having blades connected to and driven by said power means for causing a vertically downwardly directed airstream, and a cylindrical duct having an outer rim extending around and beneath said propeller for confining said airstream; and a vane system in said duct including a plurality of first vanes each extending inwardly from said rim toward the center of the duct, each said first vane providing a generally vertical wall which cooperates with adjacent walls to define vertically extending duct passages, at least some of said first vanes having an upper, fixed, rigid portion and a lower portion including a variable camber flap, and first servomotor and linkage means for varying the camber of each of said flaps, said flaps being positioned along the vertical axis of said duct so that the center of gravity of said platform lies within the limits of the upper and lower extremities of said flaps, whereby said flaps may be used to provide yaw and translational control forces to said platform without imparting significant pitch and roll moments about said center of gravity.

13. The flying platform of claim 12 further comprising:

a plurality of symmetric pairs of spoiler means affixed to at least four orthogonally extending vanes, with each spoiler means extending into an adjacent duct passage, each said pair of spoiler means being independently movable between a position interfering with airflow through the associated duct passage and a position permitting substantially full airflow therethrough; and second servomotor and linkage means for symmetrically varying the position of each said pair of spoiler means.

14. The platform of claim 13 wherein the area of each said first vane and the area of each said camber flap are substantially equal.

15. The platform of claim 13 wherein the vertical height of each said flap is approximately equal to the vertical height of its associated said rigid portion.

16. The platform of claim 12 having a ground support assembly which also serves as an exhaust and muffler system for said power means, said power means being a combustion engine having exhaust ports, said support assembly comprising:

a base hollow ring lying in a plane parallel to the upper and lower ends of said duct;

support columns connecting said ring to said duct; and exhaust tubes connecting the interior of said ring to said exhaust ports;

said ring having exhaust ports disposed at least 90° around said ring from the nearest exhaust tube, said exhaust ports being directed downwardly at about 45° from the plane of said ring.

17. The flying platform of claim 12 having a plurality of said ducted fans, each with a said vane system.

18. The flying platform of claim 13 having a plurality of said ducted fans, each with a said vane system.

19. A flying platform, comprising in combination:

at least one ducted fan including power means, a horizontally mounted propeller having blades connected to and driven by said power means for causing a vertically downwardly directed airstream, and a cylindrical duct having an outer rim extending around and beneath said propeller for confining said airstream; and a vane system in said duct including a plurality of vanes each extending inwardly from said rim toward the center of the duct, each said first vane providing a generally vertical wall which cooperates with adjacent walls to define vertically extending duct passages, and means associated with said vanes for providing yaw control forces to said platform;

a plurality of symmetric pairs of spoiler means affixed to at least four orthogonally extending vanes, with each spoiler means extending into an adjacent duct passage, each said pair of spoiler means being independently movable between a position interferring with airflow through the associated duct passage and a position permitting substantially full airflow therethrough; and second servomotor and linkage means for symmetrically varying the position of each said pair of spoiler means.

* * * * *